(12) United States Patent
Schmidt

(10) Patent No.: US 7,871,578 B2
(45) Date of Patent: Jan. 18, 2011

(54) MICRO HEAT EXCHANGER WITH THERMALLY CONDUCTIVE POROUS NETWORK

(75) Inventor: Wayde R. Schmidt, Pomfret Center, CT (US)

(73) Assignee: United Technologies Corporation, Hartford, CT (US)

( * ) Notice: Subject to any disclaimer, the term of this patent is extended or adjusted under 35 U.S.C. 154(b) by 1558 days.

(21) Appl. No.: 11/119,564

(22) Filed: May 2, 2005

(65) Prior Publication Data

US 2006/0245987 A1 Nov. 2, 2006

(51) Int. Cl.
*B01J 19/00* (2006.01)
(52) U.S. Cl. ...................................... 422/198; 422/129
(58) Field of Classification Search .................. 422/130, 422/198
See application file for complete search history.

(56) References Cited

U.S. PATENT DOCUMENTS

| | | | | |
|---|---|---|---|---|
| 5,326,504 A | * | 7/1994 | Gates | 261/112.1 |
| 5,611,214 A | | 3/1997 | Wegeng et al. | |
| 5,811,062 A | | 9/1998 | Wegeng et al. | |
| 6,040,266 A | * | 3/2000 | Fay et al. | 502/439 |
| 6,224,816 B1 | | 5/2001 | Hull et al. | |
| 6,415,860 B1 | | 7/2002 | Kelly et al. | |
| 6,616,909 B1 | * | 9/2003 | Tonkovich et al. | 423/648.1 |
| 6,656,409 B1 | | 12/2003 | Keicher et al. | |
| 6,811,744 B2 | | 11/2004 | Keicher et al. | |
| 2003/0180205 A1 | * | 9/2003 | Carlborg et al. | 423/239.1 |
| 2004/0076562 A1 | * | 4/2004 | Manzanec et al. | 422/211 |
| 2004/0116288 A1 | * | 6/2004 | Dullien et al. | 502/527.11 |
| 2006/0116713 A1 | * | 6/2006 | Sepetka et al. | 606/200 |

FOREIGN PATENT DOCUMENTS

WO     WO 02/081083 A1 * 10/2002

* cited by examiner

*Primary Examiner*—Walter D Griffin
*Assistant Examiner*—Natasha Young
(74) *Attorney, Agent, or Firm*—Carlson Gaskey & Olds PC

(57) ABSTRACT

A micro heat exchanger system includes a first flow path and a second flow path transverse thereto for transferring thermal energy between a first fluid flowing through the first flow path and a second fluid flowing through the second flow path. The first flow path and the second flow path are filled with a thermally conductive porous network which incorporate unique structures, such as tubes, honeycomb, corrugated metal, reticulated foams, woven meshes or nonwoven mats or felts, engineered lattice structures, or a combination of these structures. In another embodiment, the thermally conductive porous network is coated with catalyst to provide an integrated heat exchanger and catalytic reactors.

9 Claims, 12 Drawing Sheets

MICRO HEAT EXCHANGER WITH THERMALLY CONDUCTIVE POROUS NETWORK

BACKGROUND OF THE INVENTION

The present invention relates to a heat exchanger, and more particularly to a micro heat exchanger with microchannels formed by a thermally conductive porous network located within heat exchanger channels.

Heat exchangers are used in a wide variety of industrial, commercial, aerospace, and residential settings. The function of many types of heat exchangers is to utilize a multitude of channels to transfer as much heat as possible from one fluid (usually a liquid) to another fluid (usually a gas) in as little space as possible, with as low a pressure drop (pumping loss) as possible.

It is desirable to reduce the size of the heat exchanger needed for a given rate of heat exchange. As the heat exchangers structures shrink in size, i.e., as their surface area-to-volume ratio increases, thermal coupling between the structure and surrounding medium increases. The improved coupling is especially important for heat exchange between solid surfaces and gases, because thermal resistance at the gas-solid interface tends to dominate overall heat transfer. Miniaturization expands the list of available materials that are useful for efficient heat exchange, since small feature size allows effective heat exchange (even for materials with lower thermal conductivity, such as plastics and ceramics). Modification/control of surface chemistry at a local level is also more readily performed using microfabrication techniques.

Various conventional microfabrication techniques have been provided to manufacture a multiple of microchannels in a micro heat exchanger. The microchannels are fabricated in specific materials and designed to have precise levels, size, shape, placement and distribution. Although effective, conventional microfabrication techniques heretofore utilized to fabricate the microchannels are relatively expensive and time consuming which may limit implementation of such micro heat exchangers to relatively expensive thermal control systems.

Accordingly, it is desirable to provide a micro heat exchanger with multitudes of micro flow channels which are conducive to efficient and inexpensive manufacture.

SUMMARY OF THE INVENTION

A micro heat exchanger system according to the present invention provides a first flow path and a second flow path transverse to the first flow path for transferring thermal energy between a first fluid flowing through the first flow path and a second fluid flowing through the second flow path. The first flow path and the second flow path are filled with a thermally conductive porous network.

The thermally conductive porous network defines a multitude of microchannels that are preferably sized between 50 and 500 microns to provide high surface area for efficient thermal flow paths. The thermally conductive porous network incorporate microchannel structures, such as tubes, honeycomb, corrugated metal, reticulated foams, woven meshes or nonwoven mats or felts, engineered lattice structures, or a combination of these structures.

In another embodiment, the thermally conductive porous network is coated with catalyst to provide integrated heat exchanger and catalytic reactor functions. The thermally conductive porous network provides a medium with high external surface area and high thermal conductivity for efficient heat conduction from the fluid phase to the catalyst (for endothermic reactions) or from the catalyst to the fluid medium (for heat dissipation in exothermic reactions).

The present invention therefore provides a micro heat exchanger with multitudes of micro flow channels which are conducive to efficient and inexpensive manufacture.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 7a is a general perspective view of a micro heat exchanger with another thermally conductive porous network;

FIG. 7b is an expanded view of the thermally conductive porous network of FIG. 7a;

DETAILED DESCRIPTION OF THE PREFERRED EMBODIMENT

Figure 1:
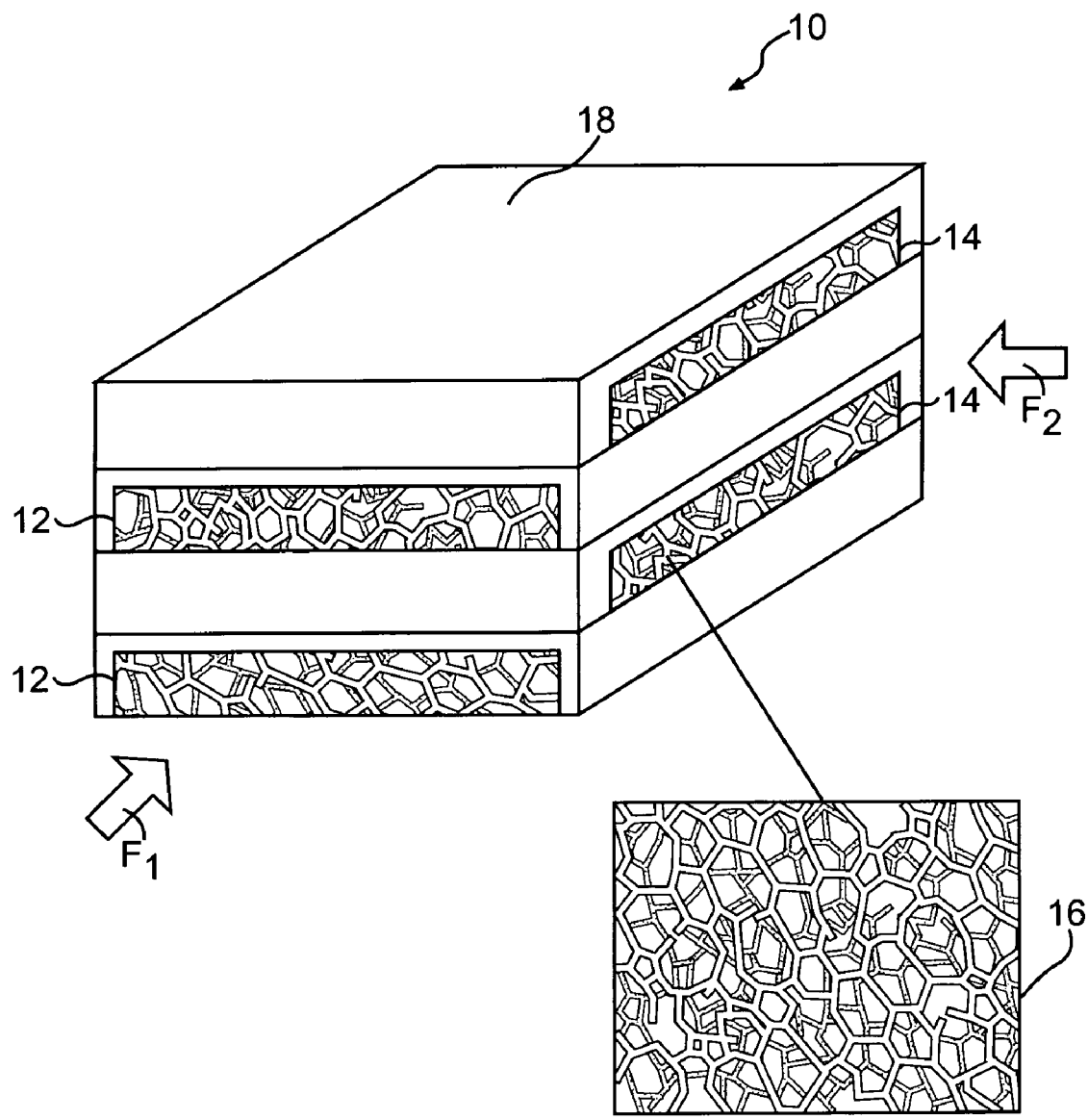
FIG. 1 is a general perspective view of a micro heat exchanger with a thermally conductive porous network.

FIG. 1 illustrates a general perspective schematic view of a micro heat exchanger system 10. The term "micro heat exchanger system" as utilized herein is defined as a fluid-based thermal device where the surface area density ratio (ratio of surface area to volume) is 5,000 $m^2/m^3$ or more. The microheat exchanger system 10 includes a first flow path 12 and a second flow path 14 transverse thereto for transferring thermal energy between a first fluid F1 flowing through the first flow path 12 and a second fluid F2 flowing through the second flow path 14. Although only two openings are illustrated for each of the first fluid F1 and the second fluid F2 in the disclosed embodiment, it should be understood that any number of paths will be usable with the present invention. That is, a sandwich structure of a multiple of interleaved serpentine paths as understood in a heat exchanger embodiment is a preferred flow path.

The first flow path 12 and the second flow path 14 are preferably filled with a thermally conductive porous network 16 which is bonded to the exterior structure 18. It should be understood that the exterior structure 18 is a housing structure which may be formed as a single component, or may be a plate-like folded structure such as an exemplary prototype device that Applicant has manufactured which utilized a Nickel metal foam from Novamet of Wyckoff, N.J., (1.9 mm thick, 594 g/m$^2$) as the thermally conductive porous network and a folded Aluminum foil alternating between the Nickel metal foam layers to provide the cross flow geometry as well as an uncomplicated manifolding system. The thermally conductive porous network 16 is metallurgical bonded by: electrolytic or electroless deposition (plating); diffusion bonding; brazing (foil, powder); microwelding; adhesives; phase changes; or combinations thereof.

It should be understood that although a particular component arrangement is disclosed in the illustrated embodiment, other arrangements will benefit from the instant invention. The thermally conductive porous network 16 defines a multitude of microchannels that are preferably sized between 50 and 500 microns to provide high surface area and direct contact which provide efficient paths for heat flow. That is, the thermally conductive porous network 16 forms the microchannels within the relatively larger first flow path 12 and the second flow path 14 to simplify construction. In other words, rather than manufacturing the microchannels individually as heretofore understood, the thermally conductive porous network 16 provides the multiple microchannels as a complete element.

Microchannel devices have been demonstrated as offering significant improvements to existing conventional devices due to their small size, high surface area, and low pressure drop. For example, significant improvements in total surface area per unit volume, heat transfer coefficients (at least 10× better than "conventional"), and pressure drop (restricted to a few psi due to the short channel lengths) are possible.

The open void structure of the thermally conductive porous network 16 is selected to minimize pressure drop and is preferably metallurgically bonded to the solid exterior structure 18 or housing which forms the first flow path 12 and the second flow path 14 to ensure efficient heat transfer.

Figure 2:
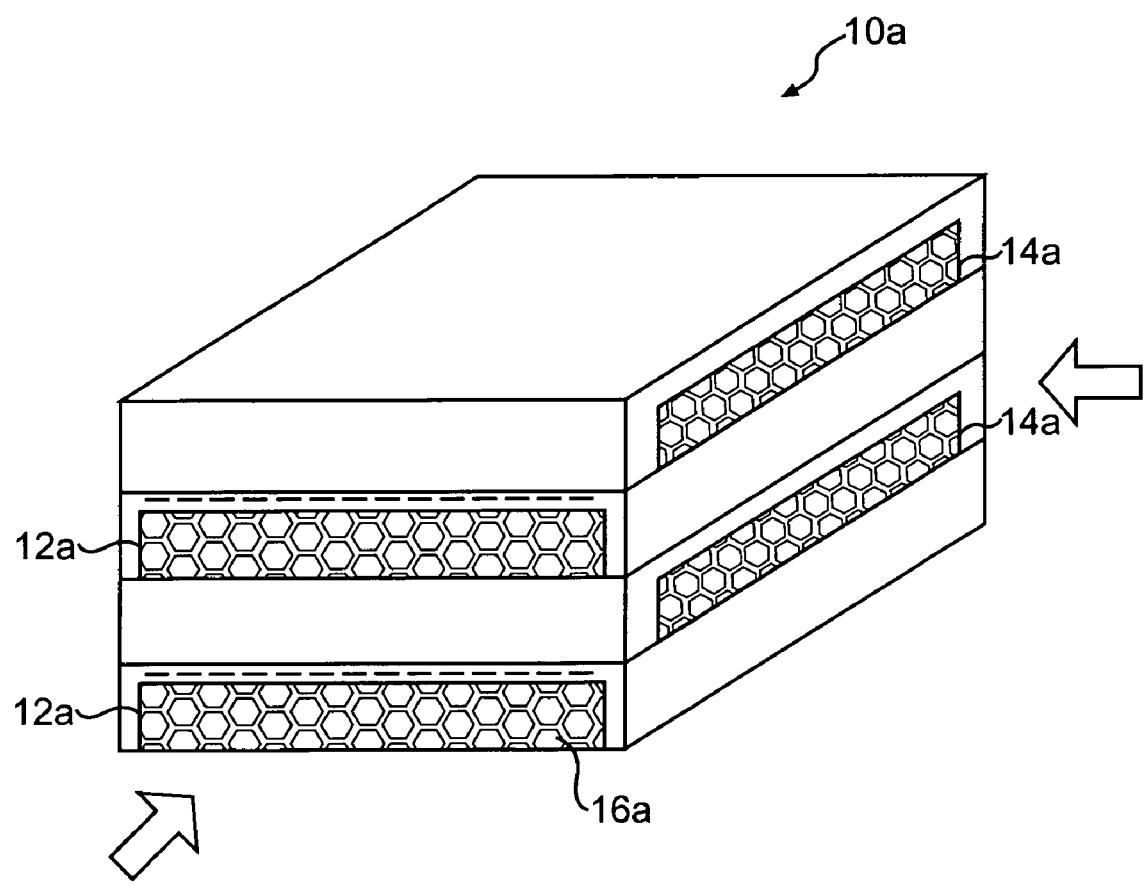
FIG. 2 is a general perspective view of a micro heat exchanger with another thermally conductive porous network.

Referring to FIG. 2, the first flow path 12a and the second flow path 14a of another heat exchanger system 10a are filled with a thermally conductive porous network 16a such as a metal honeycomb. The honeycomb structure is preferably selected to provide the "microchannel" features as described above. The interior channels of the honeycomb passages provide high surface area and minimal pressure drop. The honeycomb is preferably metallurgically bonded to the structure of the first flow path 12a and the second flow path 14a to ensure efficient heat flow.

Figure 3:
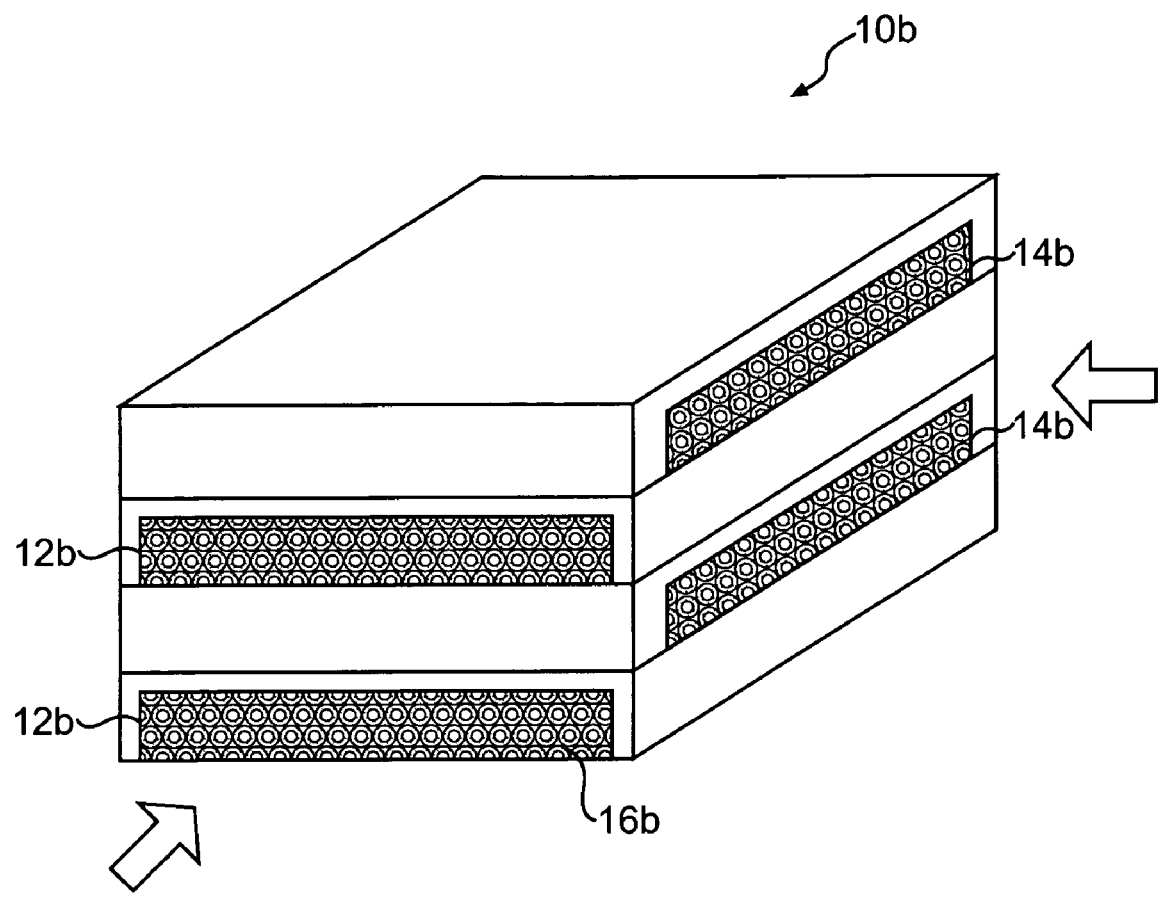
FIG. 3 is a general perspective view of a micro heat exchanger with another thermally conductive porous network.

Referring to FIG. 3, the first flow path 12b and the second flow path 14b of the heat exchanger system 10b are filled with a thermally conductive porous network 16b such as a metal capillary tubing. The diameter and thickness of the tubing is selected to provide the "microchannel" features as described above. It should be understood that although tubes of circular cross-section are disclosed in the illustrated embodiment, the tubes may have any cross-sectional geometry such as circular, square, elliptical, star, or such like. A metallurgical bond is preferably provided between the exterior structure 18b and the tubing (and between tubes), to ensure efficient heat flow.

Figure 4:
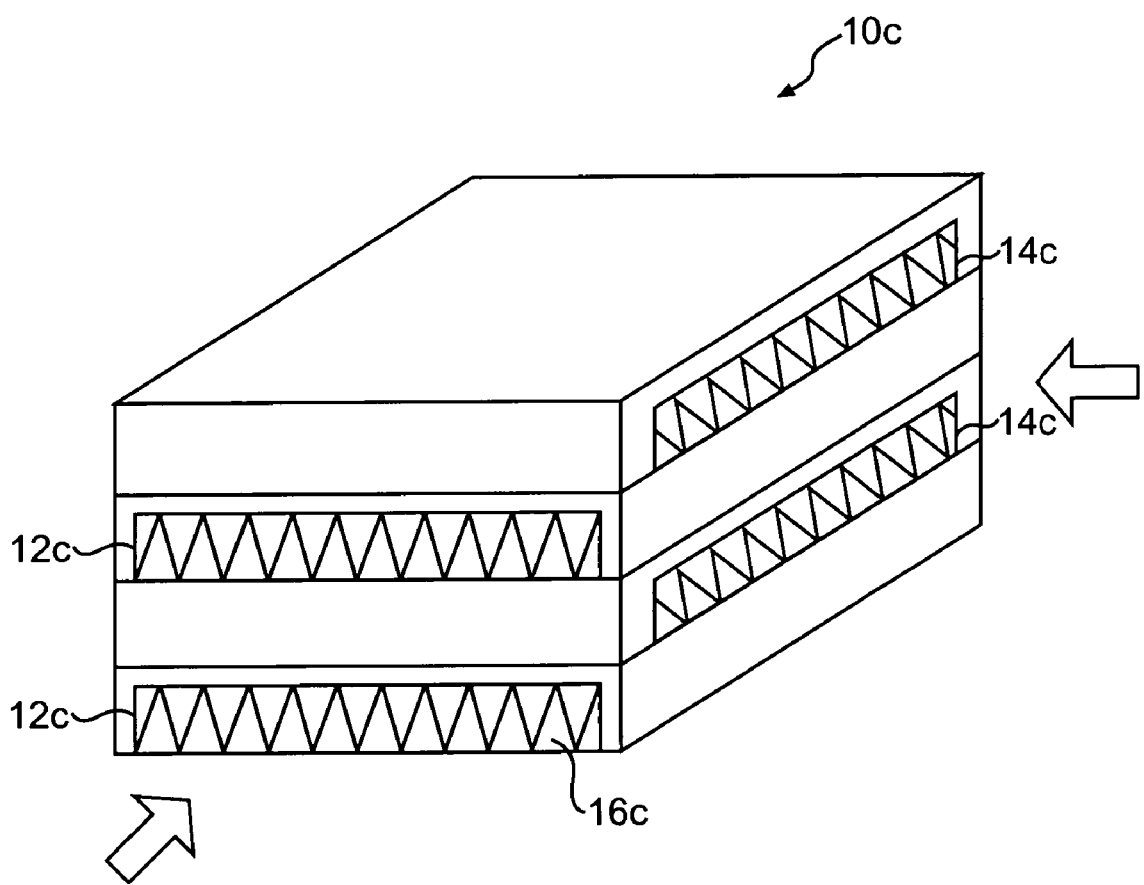
FIG. 4 is a general perspective view of a micro heat exchanger with another thermally conductive porous network.

Referring to FIG. 4, a first flow path 12c and a second flow path 14c of a heat exchanger system 10c are filled with a thermally conductive porous network 16c such as a corrugated metal sheet stock. The corrugated metal sheet stock is selected to match the size of the "microchannel" features as described above and include a metallurgical bond between with the structure of the heat exchanger system 10c.

Figure 5:
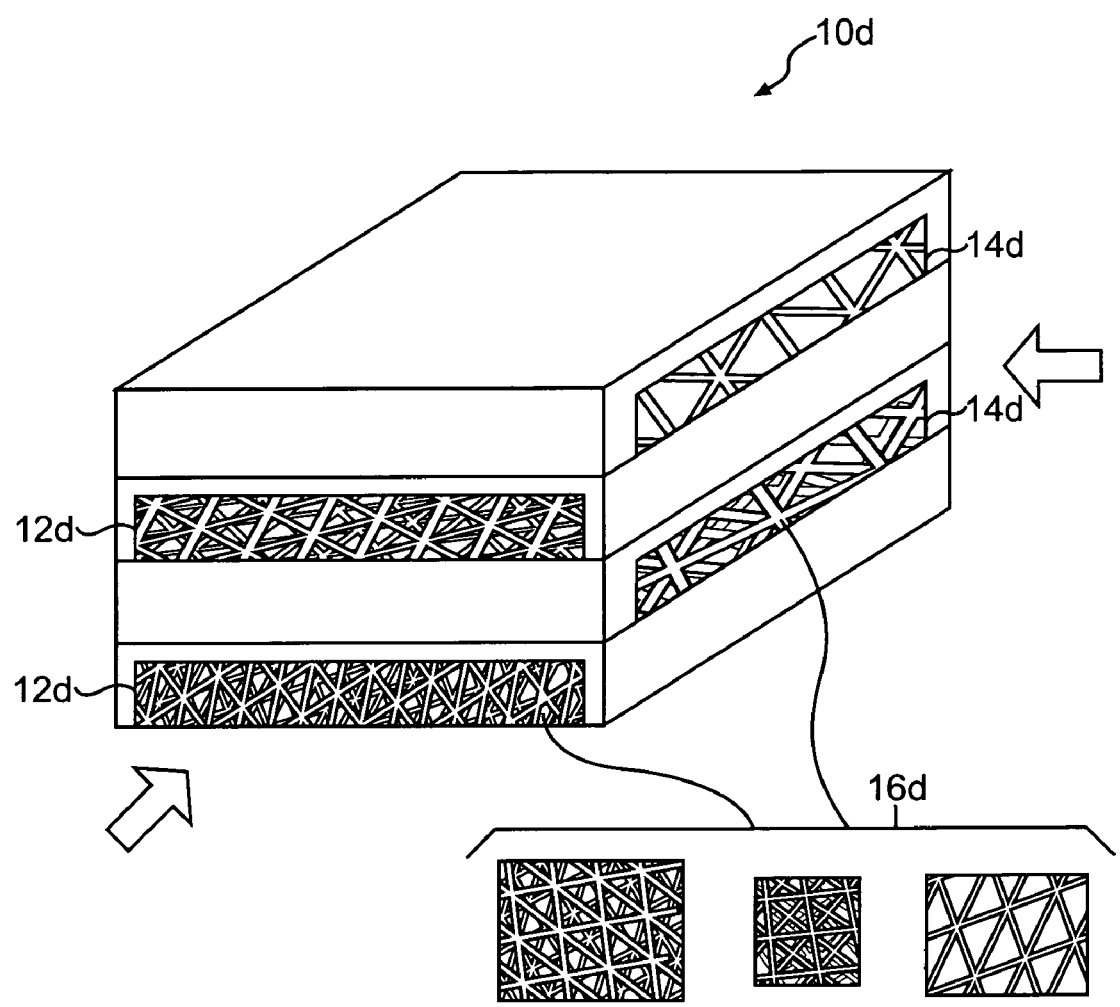
FIG. 5 is a general perspective view of a micro heat exchanger with another thermally conductive porous network.

Referring to FIG. 5, a first flow path 12d and a second flow path 14d of a heat exchanger system 10d are filled with a thermally conductive porous network 16d such as an engineered metal lattices, such as Jonathan Aerospace Materials of Wilmington, Mass. microperf or lattice block material (LBM). The lattice is selected to match the size of the "microchannel" features as described above and include a metallurgical bond between with the exterior structure 18c of the heat exchanger system 10c. It should be understood that a variety of different lattice structures may be used with the present invention.

Figure 6:
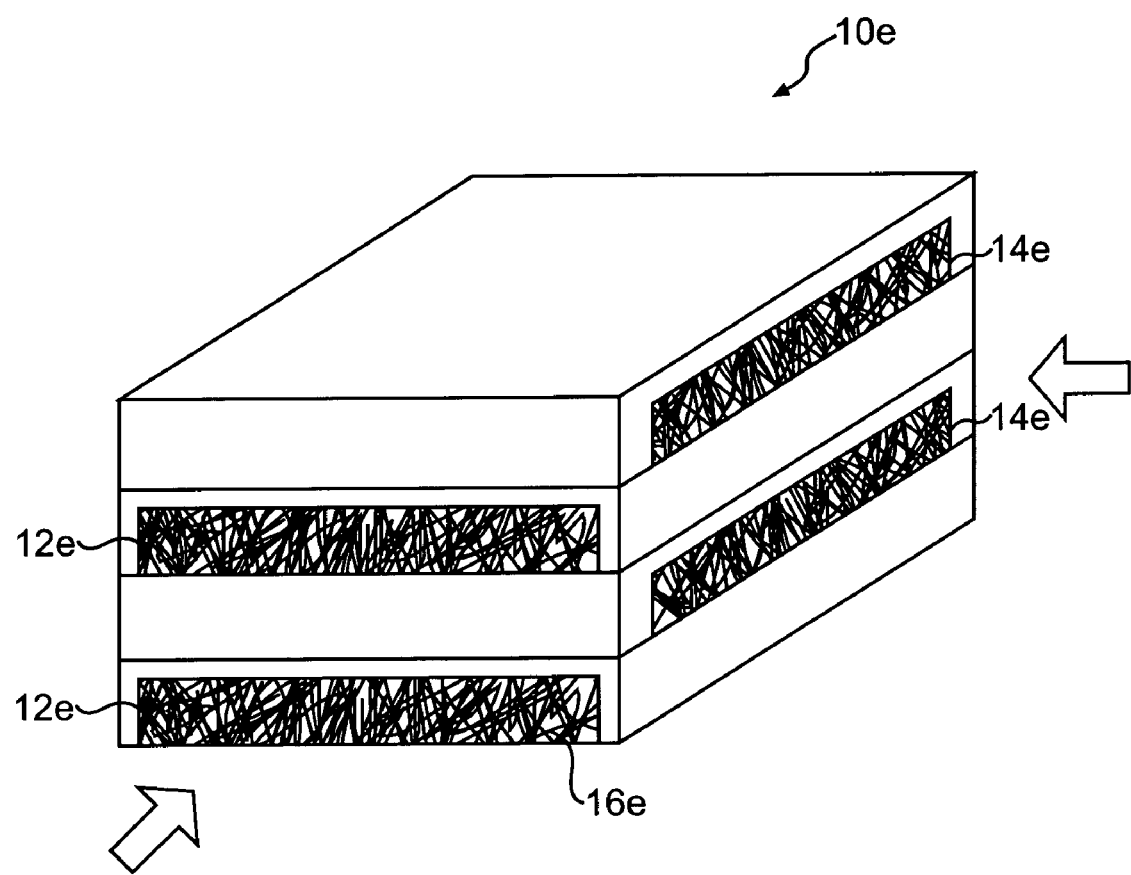
FIG. 6 is a general perspective view of a micro heat exchanger with another thermally conductive porous network.

Referring to FIG. 6, a first flow path 12e and a second flow path 14e of a heat exchanger system 10e are filled with a thermally conductive porous network 16e such as a chopped metal wire. The chopped metal wire may be woven such as in a screen or may be nonwoven such as in a felt or mat. The chopped metal wire is selected to match the size of the "microchannel" features as described above and provide a metallurgical bond between with the structure of the heat exchanger system 10e. When metallurgically bonded to the exterior structure, the wire provides a direct path for efficient heat flow.

Figure 7:
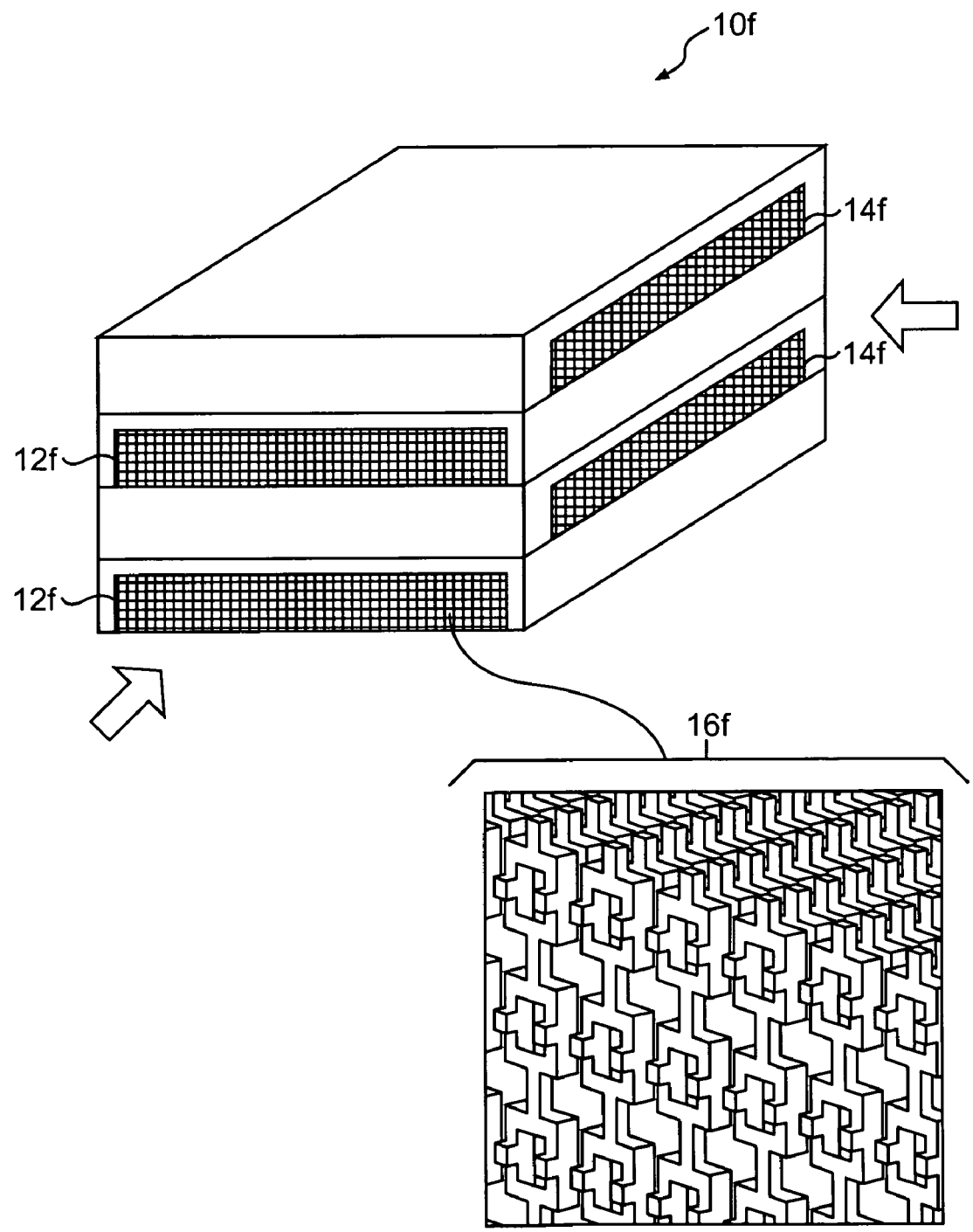
Figure 7B:
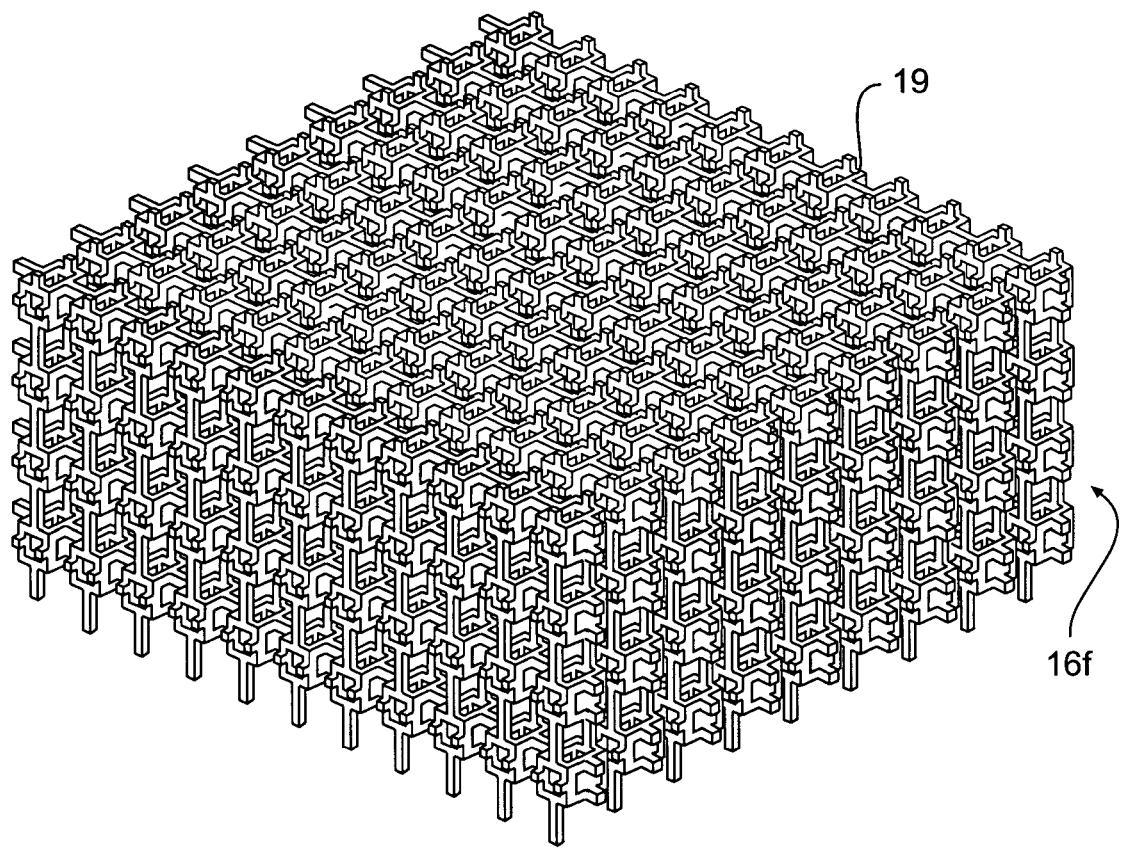

Referring to FIG. 7A, a first flow path 12f and a second flow path 14f of a heat exchanger system 10f are filled with a thermally conductive porous network 16f such as a symmetric structure of a repeatable geometry (FIG. 7B) which is metallurgically bonded to the exterior structure 18f.

Figure 7C:
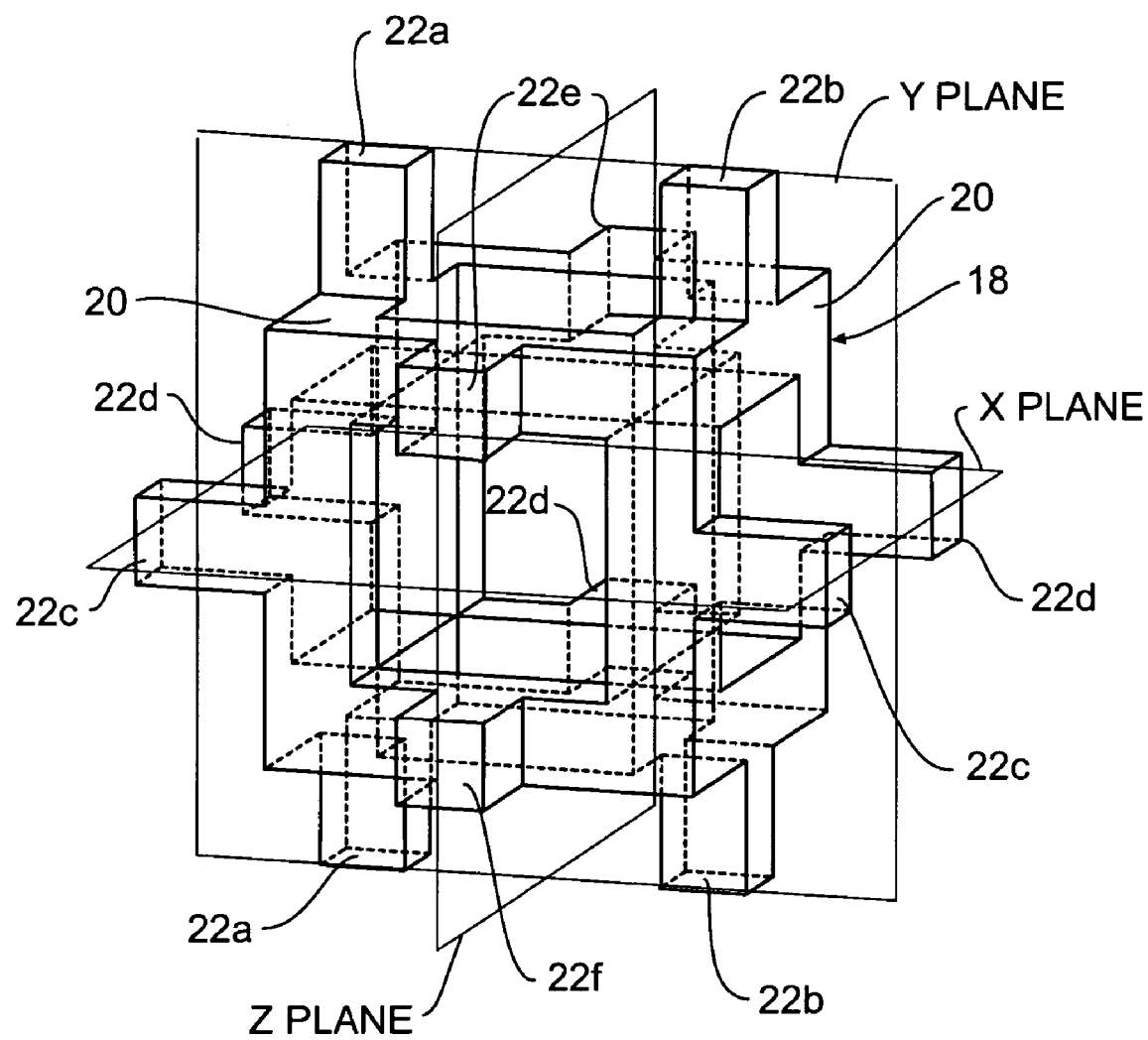
FIG. 7c is an expanded view of a single cubic structure of the thermally conductive porous network of FIG. 7b.

Referring to FIG. 7C, the symmetric structure is preferably constructed from a multiple of open cubic structures 19. The open cubic structure 19 preferably includes an open cube that defines a multiple of open square sides 20 each having a pair of extending connecting members 22 which project from the open square sides 20. The extending connecting members 22 are mirrored on opposite sides but are opposed on adjacent sides. A top and bottom of the open cubic structure 19 includes the pair of connecting members 22a, 22b in a Y-plane while the sides includes a pair of connecting members 22c, 22d which are in an X-plane perpendicular to the Y-plane while connecting members 22e, 22f are located within a Z-plane. That is, opposed sides 20 include connecting members in a common plane.

Figure 7D:
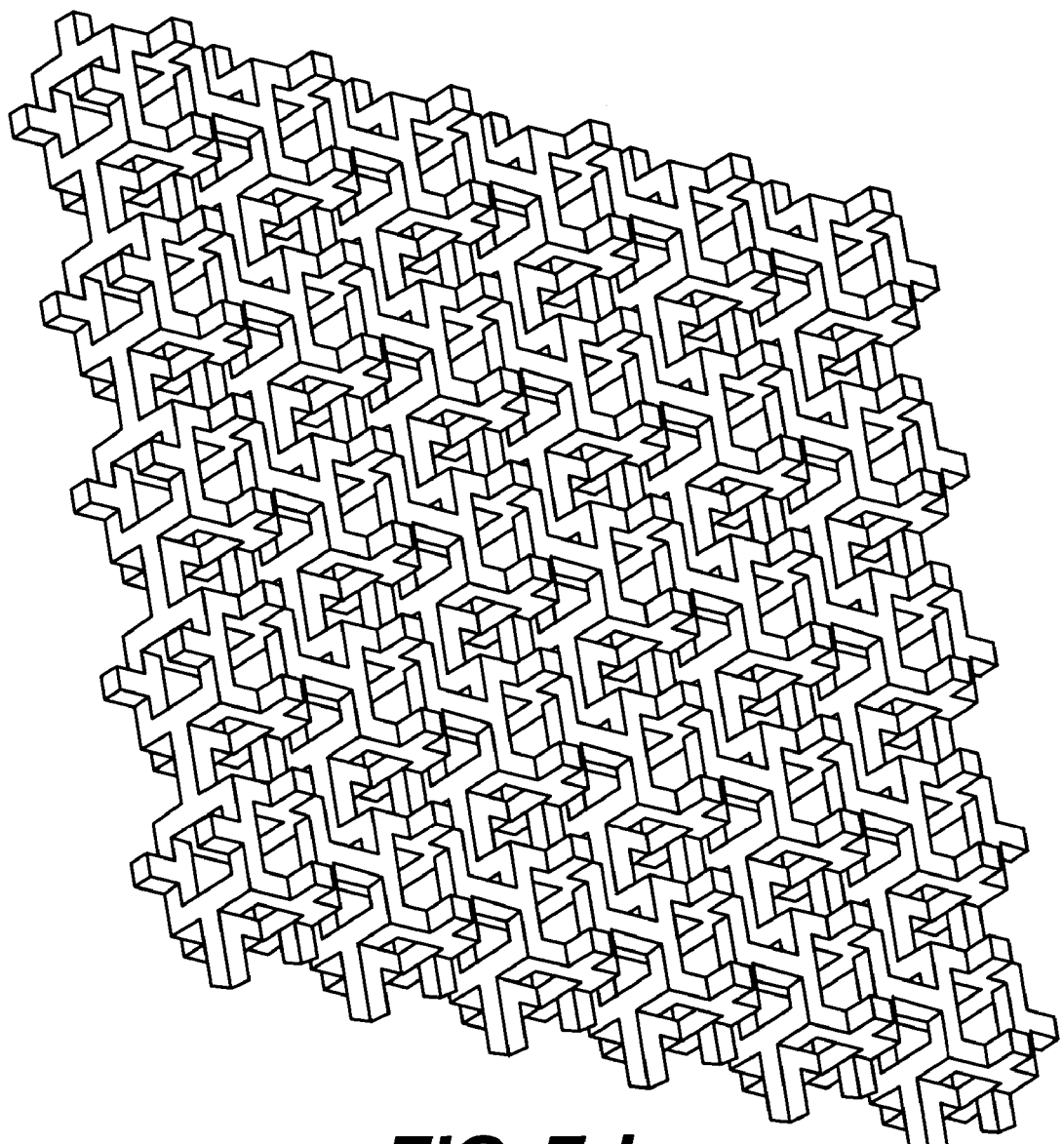
FIG. 7d is an expanded view of a single layer of the cubic structure illustrated in FIG. 7c.
Figure 8:
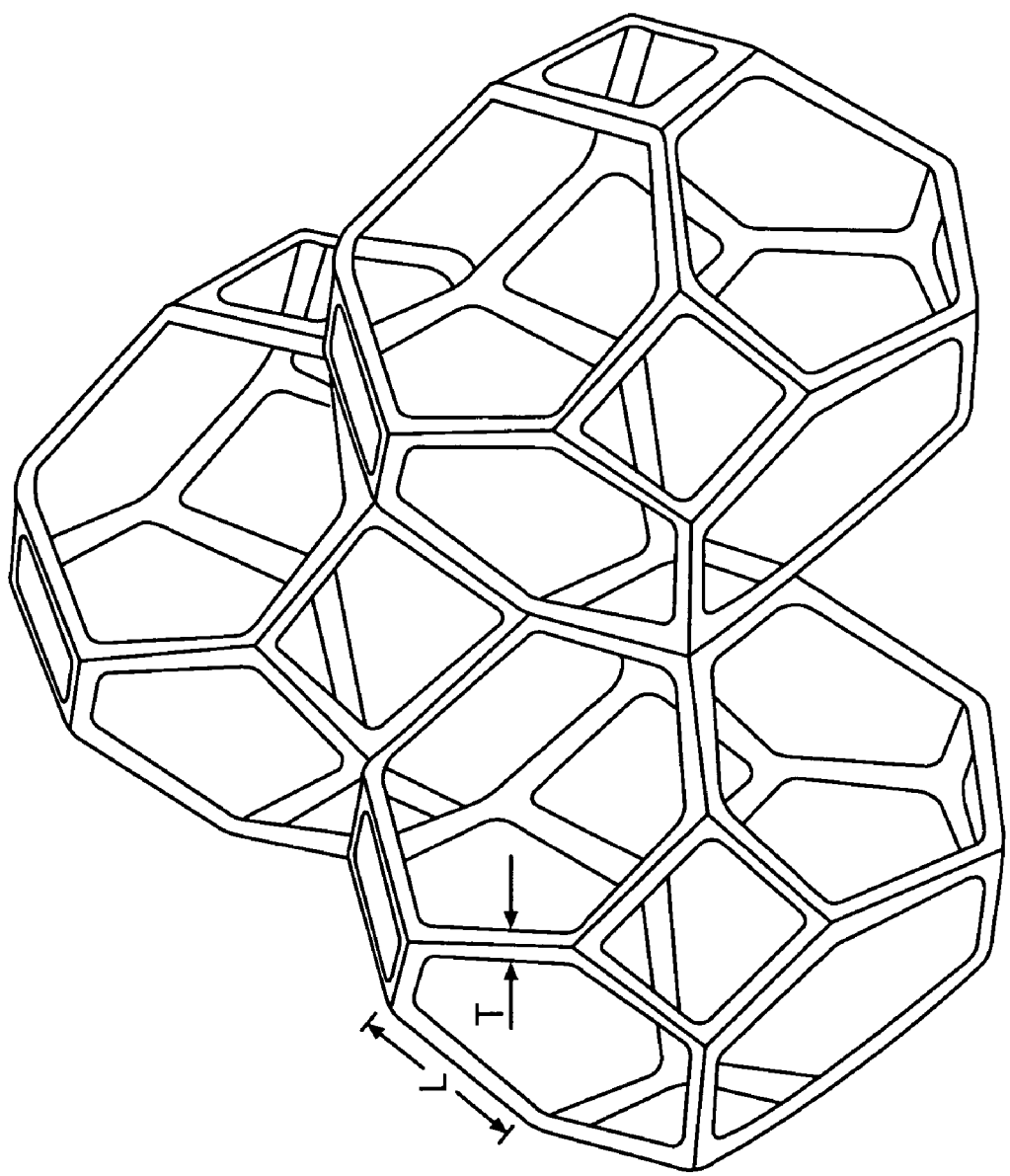
FIG. 8 is an expanded view of a polygonal structure following the building principles of FIG. 7b.
Figure 9:
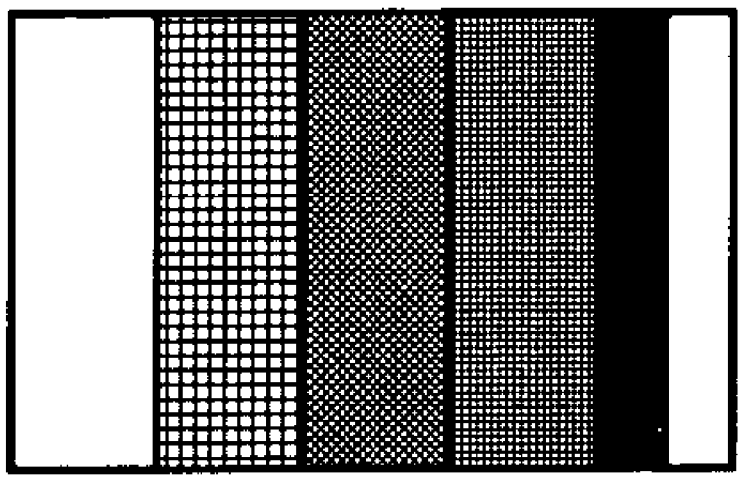
FIG. 9 is a schematic view of the thermally conductive porous network of FIG. 7b with a graded porosity.

The open cubic structure 19 are preferably manufactured by a conventional solid freeform fabrication technique (selective laser sintering, SLS, using steel powder and copper infiltrant, such that an interconnected rectilinear lattice structure is readily manufactured by contact between the pairs of the connecting members 22a-22f (FIG. 7D). Other manufacturing methods include additive microfabrication process based on multi-layer selective electrodeposition of metals such as that produced with EFAB® technology by Microfabrica Inc of Burbank, Calif., USA. It should be understood that symmetric structure other than open cubes such as open polygonal members may also be used in accordance with the present invention. Solid structures of different pore sizes may be combined with those containing other pore sizes, to create solid structures with graded porosity (FIG. 9) along the flow paths. Furthermore, tiling, regular, fitted, unstructured, multigrids, and space filling mathematical operations may be applied to these solid models to create additional levels of grading such as to provide fractal structures.

The thermally conductive porous network 16 in any choice of material system (metal, ceramic, polymer or hybrid) and using any specific material (nickel, titanium, aluminum oxide, silicon carbide, etc.) permits design and fabrication flexibility for optimized performance of the heat exchange function. Selective catalyst functions may be employed simultaneously with the heat exchange function such as by incorporating two solid materials (e.g. open cell metal foam and polymeric, ceramic or glass fillers) to obtain a combination of properties which would not otherwise be available with a monolithic material used in a heat exchange device.

More specifically, the case of integrated heat exchangers and catalytic reactors requires a structure which provides high external surface area and high thermal conductivity for efficient heat conduction from a fluid medium to the catalyst (for endothermic reactions) or from the catalyst to the fluid medium (for heat dissipation in exothermic reactions). In addition, this structure is preferably: highly dispersed within the catalytic and fluid phase; continuous for effective, uniform and non localized heat transfer; open (inter-connective) porosity, i.e. the amount of non-closed or "dead-end" space is minimized to maintain continuous fluid flow and high turbulence. Open porosity is also very significant for uniform, homogeneous distribution of the catalytic phase within the heat exchanger structure (in the case of pelletized catalyst particles) or on the surface of the heat exchanger structure (in the case of coatings).

The thermally conductive porous network 16 coated with catalyst are highly desirable since they do not suffer intra-particle diffusion limitations and therefore, low effectiveness factors. In addition, these structures are significantly less prone to rapid catalyst deactivation in the case of chemical reactions that involve hydrocarbon fuels (catalytic combustion, desulfurization and steam reforming). The lack of micropores avoids rapid deactivation modes from chemisorbed hydrocarbon molecule dehydrogenated fragments or coke buildup due to heavy hydrocarbon condensation within the micropores or due to pore mouth plugging. Continuous porosity also avoids "pockets" of stagnant flow (as is the case of "dead-end" pores) and therefore, reduces carbon build up in the system. Therefore, not only does the process become more effective (size reduction), but the lifetime of the catalyst is improved. The latter benefit is extremely important for gasoline desulfurization and autothermal reforming for PEM fuel cell processors.

Continuous porosity structures, especially those with repeatable geometry (such as FIG. 7B) result in uniform coating of the catalyst phase (i.e. no localized catalyst phase build-ups or high catalyst/low catalytic phase concentration regimes) and therefore, in a more effective chemical process. An example in this case could be the avoidance of hot spots in catalytic combustion systems. Furthermore, the overall process can be mathematically modeled for design purposes which results in a minimal waste of catalyst and a more economical device. Repeatable geometry also result in lower pressure drop than random geometry (for the same system volume, diameter, porosity and flow rate) and possible higher convention heat transfer coefficient (boundary layer theory).

The processes that manufacture the structures not only produce the desirable, repeatable geometry, but also use a broad spectrum of material systems that can combine heat transfer benefits with excellent adhesion of the catalyst phase at various operating temperatures for the case of coatings.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A micro heat exchanger system comprising:
a heat exchanger structure which defines a first flow path and a second flow path operable to transfer thermal energy between a first fluid flowing through said first flow path and a second fluid flowing through said second flow path; and
a thermally conductive porous network located within said first flow path said thermally conductive porous network including a symmetric repeatable cubic structure.

2. The micro heat exchanger system as recited in claim 1, wherein said thermally conductive porous network includes a polygonal structure.

3. The micro heat exchanger system as recited in claim 1, wherein said heat exchanger has a surface area density ratio (ratio of surface area to volume) of at least $5,000 m^2/m^3$.

4. The micro heat exchanger system as recited in claim 1, wherein said thermally conductive porous network is coated with a catalyst.

5. The micro heat exchanger system as recited in claim 1, wherein said symmetric cubic structure includes a multiple of open cubes.

6. The micro heat exchanger system as recited in claim 5, wherein each of said open cubes includes a side with a pair of connecting members.

7. The micro heat exchanger system as recited in claim 6, wherein said pair of connecting members are mirrored on an opposite side of said open cube and are opposed on adjacent sides of the open cube.

8. The micro heat exchanger system as recited in claim 5, wherein said multiple of open cubes are rectilinear.

9. The micro heat exchanger system as recited in claim 1, wherein said symmetric structure provides a graded porosity along said first flow path.

* * * * *